United States Patent

Hitachi et al.

[11] Patent Number: 5,979,945
[45] Date of Patent: Nov. 9, 1999

[54] COMMON RAIL

[75] Inventors: Yuzo Hitachi; Eiji Watanabe, both of Shizuoka Prefecture, Japan

[73] Assignee: Usuikokusai Sangyo Kaisha Ltd., Japan

[21] Appl. No.: 08/984,408

[22] Filed: Dec. 3, 1997

[30] Foreign Application Priority Data

Dec. 7, 1996 [JP] Japan .................................. 8-342538

[51] Int. Cl.⁶ .............................. F16L 43/00; F16L 25/00
[52] U.S. Cl. ................................. 285/125.1; 285/133.11; 285/332.3
[58] Field of Search .......................... 285/125.1, 133.11, 285/353, 354, 332.1, 332.2, 332.3, 332.4, FOR 132, FOR 138; 123/469

[56] References Cited

U.S. PATENT DOCUMENTS

| | | | |
|---|---|---|---|
| 4,832,376 | 5/1989 | Sugao | 285/141.1 |
| 4,893,601 | 1/1990 | Sugao | 123/468 |
| 4,900,180 | 2/1990 | Takikawa | 403/233 |
| 5,120,084 | 6/1992 | Hashimoto | 285/133.11 |
| 5,143,410 | 9/1992 | Takikawa | 285/197 |
| 5,169,182 | 12/1992 | Hashimoto | 285/332.2 |
| 5,172,939 | 12/1992 | Takikawa | 285/24 |
| 5,551,733 | 9/1996 | Henwood | 285/155 |
| 5,667,225 | 9/1997 | Kato | 277/563 |

Primary Examiner—James R. Brittain
Assistant Examiner—Gary Grafel
Attorney, Agent, or Firm—Anthony J. Casella; Gerald E. Hespos; Ludomir A. Budzyn

[57] ABSTRACT

A common rail is provided in the pipe joint of the branch connector to improve the strength and resistance against the internal pressure fatigue; said common rail having a longitudinal conduit of a substantially circular section therein and a plurality of branch holes formed in its circumferential wall at an axial spacing, each of the branch holes having a pressure receiving seat formed on the circumferential face thereof and opened to the outside, wherein connected by means of branch connector having a conduit to communicate with the conduit of the common rail, a joint head formed at the end thereof and forming a pressure seat so that the branch pipe is engaged by bringing the pressure face thereof into abutment against the pressure receiving face, a joint portion made integral with or separate from the main pipe rail, and a nut assembled in advance in the branch pipe and fastened into the joint portion against the pressure of the joint head thereby. The branch hole is formed into an elliptical hole and offset in the radial direction of the conduit of the common rail.

11 Claims, 8 Drawing Sheets

PRIOR ART

PRIOR ART

PRIOR ART

COMMON RAIL

BACKGROUND OF THE INVENTION

1. Field of the Invention

The present invention relates to a common rail in a Diesel internal combustion engine, such as a main pipe rail comprising a manifold or a block rail for high-pressure fuel, fastened and jointed by a branch connector such as a branch pipe or a branch fitting.

2. Description of the Prior Art

In one of this kind of joint structure for a common rail of the prior art, as shown in FIG. 9A, a main pipe rail 11 is known; a branch hole 11-2 of a circular section formed in the circumferential wall of a main pipe rail 11 of a circular section and communicating with an internal conduit 11-1 of a circular section is formed to have a pressure receiving seat 11-3 opened to the outside, and a ring-shaped joint fitting 13 enclosing the outer circumference of the main pipe rail 11 in the vicinity of the pressure receiving seat is used to bring a pressure seat 12-3, which is formed by a joint head 12-2 of a branch pipe 12 as a branch connector tapered by the buckling method, into abutting engagement with the end portion of the pressure receiving seat 11-3, so that the branch pipe 12 is jointed to the main pipe rail 11 by fastening a nut 14, which is assembled in advance in the branch pipe 12, by pressure below the neck of the joint head 12-2 into a threaded wall 13-1 protruded from the joint fitting 13. In place of the ring-shaped joint fitting 13, as shown in FIG. 10A, a cylindrical sleeve nipple 13a is mounted so directly on the outer circumference of the main pipe rail 11 as a common rail by the welding or soldering method as to protrude radially of the main pipe rail 11, and the pressure seat 12-3, as formed by the joint head 12-2 of the branch pipe 12, is brought into abutting engagement with the pressure receiving seat 11-3 of the main pipe rail 11, so that the branch pipe 12 is jointed to the main pipe rail 11 by fastening the nut 14 into the sleeve nipple 13a. In all these common rails of the prior art, as shown in FIGS. 9B and 10B, the center of the conduit 11-1 of circular section of the main pipe rail 11 is aligned with the center of a conduit 12-1 of the branch connector 12. Reference numeral 15 designates a sleeve washer.

As shown in FIG. 11, moreover, another common rail is constructed by using an L-shaped branch fitting 22 as a branch connector between the branch pipe 12 and the main pipe rail 11. For this branch connector connecting to the common rail, the case of using the branch fitting such as an elbow or the case of using the branch fitting equipped therein with an equal-pressure valve, an attenuation valve, a feed valve, a discharge valve or a flow control valve is taken into consideration so as to avoid such an interference with other parts as will occur due to a large curvature of the branch pipe when this pipe is to be bent. In the common rail exemplified herein, the branch fitting 22 is equipped at its one end with a spherical pressure head 22-1 having a spherical pressure seat 22-2 so that this pressure seat 22-2 is brought into abutting engagement with a pressure receiving seat 11-3' at the main pipe rail 11 by screwing a threaded face 22-3 formed in the outer circumference of the branch fitting 22 into a threaded face 13'-1 of a joint fitting 13'. To the other end of the branch fitting 22, there is connected by the branch pipe 12 which is fixed by screwing a cap nut 24 through a sleeve 25. According to this construction, the branch pipe 12 can be led out in parallel with the axial direction of the main pipe rail 11.

In the common rail of the prior art having the structure in which the branch hole 11-2 having the circular section is mounted on the main pipe rail 11 as a common rail having the circular section in alignment with the center of the conduit 11-1 of circular section of the main pipe rail 11, however, the maximum stress is established at the open end P of the main pipe rail passage 11-1 of the conduit 12-1 of the branch pipe 12 as a branch connector when the internal pressure acts upon the main pipe rail 11 so that a crack is liable to start from the open end P to invite the fuel leakage.

SUMMARY OF THE INVENTION

The invention has been conceived in view of the aforementioned problems of the prior art and has an object to provide a common rail which is enabled to improve the strength against the internal pressure fatigue by lowering the maximum stress to be established in the common rail open end of the conduit of the branch connector.

According to a first embodiment of the invention, there is provided a common rail, having a longitudinal conduit of a substantially circular section therein and a plurality of branch holes formed in its circumferential wall at an axial spacing, each of the branch holes having a pressure receiving seat formed on the circumferential face thereof and opened to the outside, wherein connected by means of a branch connector comprising a conduit to communicate with said conduit, a joint head formed at the end thereof and forming a pressure face abuttingly engaged with the pressure receiving seat formed by the joint head, a joint portion made integral with or separate from the common rail, and a nut assembled in advance in the branch connector and fastened into the joint portion against the pressure of the joint head thereby, wherein the branch hole at the side of the common rail is formed into an elliptical hole having a longer diameter normal to the axes of both the common rail and the branch connector aligned with the center of the conduit of the common rail.

According to a second embodiment, moreover, there is provided a common rail, having a longitudinal conduit of a substantially circular section therein and a plurality of branch holes formed in its circumferential wall at an axial spacing, each of the branch holes having a pressure receiving seat formed on the circumferential face thereof and opened to the outside, wherein connected by means of a branch connector comprising a conduit to communicate with the said conduit, a joint head formed at the end thereof and forming a pressure face abuttingly engaged with pressure receiving seat formed by the joint head, a joint portion made integral with or separate from the common rail, and a nut assembled in advance in the branch connector and fastened into the joint portion against the pressure of the joint head thereby, wherein the branch hole at the side of the common rail is formed into an elliptical hole having a longer diameter normal to the axes of both the branch connector and the common rail and offset in the radial direction of the conduit of the common rail.

In this invention, it is based on the result of the numerous experiments, as repeated by us, that the branch hole to be formed in the conduit of substantially circular section of the common rail is formed into the elliptical hole having a longer diameter normal to the axes of the common rail and the branch connector. The elliptical also is offset in the common rail.

Specifically, with a view to reducing the maximum value of the stress to be established at the open end of the branch hole, as opened into the conduit of the main pipe rail as a common rail, we examined the individual stress concentration portions and maximum stresses when the internal pressure is applied to the individual pipes, by employing the main pipe rail actually used as a common rail comprising a pipe of circular section, by forming the branch holes of circular and elliptical shapes, and by orienting the longer diameters of the elliptical holes in normal to the axes of the common rail and the branch connector or alternatively in a second direction parallel to the axis in a first direction of the pipe. These examinations have revealed that a high stress was established at the axial two ends of the opening of the branch hole having the section of true circularity, as described hereinbefore, when the branch hole was aligned with the center of the conduit of the pipe having a circular section. When the branch hole of an elliptical shape having a longer diameter normal to the axes of the common rail and the branch connector in a pipe of a circular section was aligned with the center of the conduit of the pipe, on the other hand, the stress value at the two axial ends of the opening of the elliptical hole in the inner circumference of the pipe could be made far lower than that of the case of the aforementioned branch hole of true circularity. It has also been revealed that even the elliptical hole experienced, if oriented (in the longer diameter) in the axial direction of the pipe having the circular section (in the axial direction of the conduit of the circular section,) a far higher stress than that of the case of the branch hole of a shape of true circularity at the open end of the branch hole in the inner circumference of the pipe, so that it could not be adopted in the least.

We also have examined the stress concentration portion and the maximum stress on the case in which the elliptical branch hole having a longer diameter normal to the axes of the common rail and the branch connector in a conduit of the pipe having a circular section was offset normal to the axes of both the branch connector and the common rail. As a result, at the open end of the elliptical branch hole in the inner circumference of the pipe, there was established a stress which was comparable to the case in which the elliptical branch hole was placed on the center axis of the pipe. It also has been revealed that this structure was especially effective for reducing the stress as in the foregoing case, so that the stress at the branch hole when the internal pressure acted upon the main pipe rail could be drastically reduced as compared to the case of the aforementioned branch hole of circularity.

In this invention, as above mentioned, the branch hole to be mounted on the conduit of substantially circular section of the common rail is formed into an elliptical hole having a longer diameter normal to the axes of the branch connector and the common rail and also offset in a direction normal to the axes of the branch connector and the common rail, so that the establishment of the stress at the branch hole can be effectively suppressed to improve the strength against the internal pressure fatigue drastically in each branch connector mounting portion. Here, the ellipse in the invention should include a race track shape.

DETAILED DESCRIPTION OF THE PREFERRED EMBODIMENTS

Figure 1:
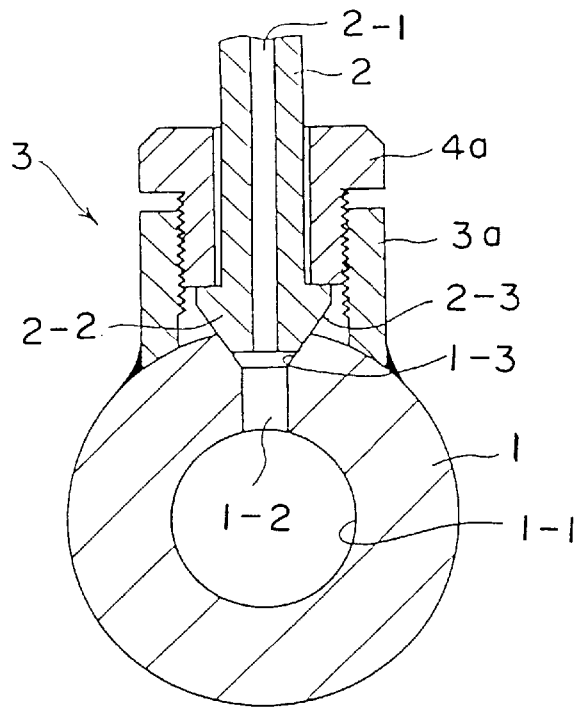
FIG. 1 is a sectional view showing a portion of a joint structure of connecting a branch connector to a main pipe rail as a common rail according to a first embodiment of the invention.

This invention will be described with reference to FIGS. 1 to 8. Reference numeral 1 designates a main pipe rail as a common rail; numeral 2 designates a branch connector; numeral 3 designates a joint portion formed into a sleeve nipple 3a or 3b or a boss 3c; and numeral 4a or 4b designate a nut.

The main pipe rail 1 acting as the common rail is made of a thick steel pipe such as a pressure piping carbon steel stainless steel pipe having a diameter of about 30 mm or less, as in the prior art, and is exemplified by a relatively thick metal pipe (having a section of true circularity) of STS 480 having a diameter of about 20 mm and a thickness of about 6 mm, and has therein a conduit 1-1 of a circular section on its axis and branch holes 1-2 at axial spacings in its circumferential wall. These branch holes 1-2 are elliptical holes communicating with the conduit 1-1 and having circumferential faces opened to the outside and formed into pressure receiving seat 1-3. Each branch hole is formed, as shown in FIG. 2, into the elliptical hole which has a longer diameter normal to the axes of both the respective branch hole 1-2 and the conduit 1-1 of main pipe rail 1, and pressure receiving seat 1-3 is a generally conical face for connecting a pressure face having a generally conical face, as will be described hereinafter.

Figure 2:
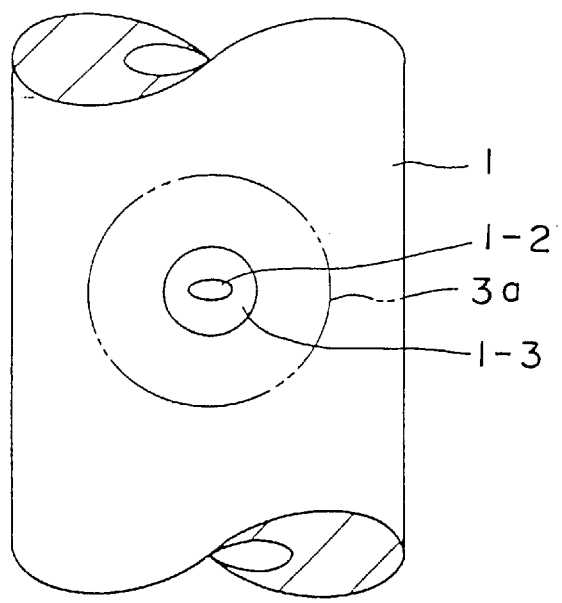
FIG. 2 is a top plan view showing a branch hole portion of the main pipe rail in the joint structure of the branch connector of FIG. 1.

In the embodiment of the joint structure of the branch pipe shown in FIGS. 1 and 2, the branch connector 2 is made of a branch pipe or branch fitting and has therein a conduit 2-1 to communicate with the conduit 1-1 and at its end portion the pressure face 2-3 which is formed by the joint head 2-2 radially enlarged into a tapered conical shape. A cylindrical sleeve nipple 3a having on its inner circumference a threaded face to be screwed on the nut 4a assembled in advance with the branch connector 2 is employed as the joint portion 3 and is welded at its base end so concentrically of the pressure receiving seat to the outer circumference of the main pipe rail 1 in the vicinity of the pressure receiving seat 1-3 as to enclose the pressure receiving face, and the pressure face 2-3 formed by the joint head 2-2 of the branch connector 2 is brought into abutting engagement with the pressure receiving seat 1-3 of the main pipe rail 1, so that the branch connector 2 is jointed to the main pipe rail 1 by fastening the nut 4a into the sleeve nipple 3a. Here, the size of the branch hole 1 or the elliptical hole is properly determined according to the maximum injection rate of a fuel, the diameter of the conduit 1-1 and and thickness of the common rail 1 and so on.

Figure 3:
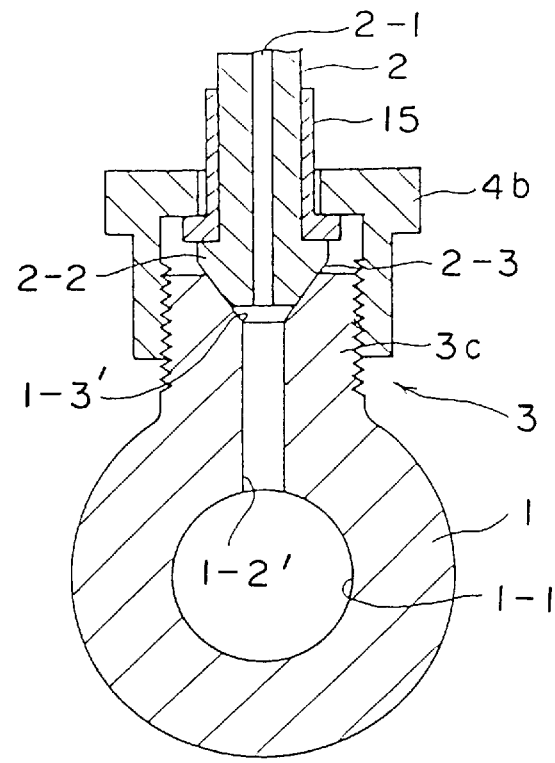
FIG. 3 is a sectional view showing a portion of another joint structure of the branch connector in the main pipe rail according to the first embodiment of the invention.
Figure 4:
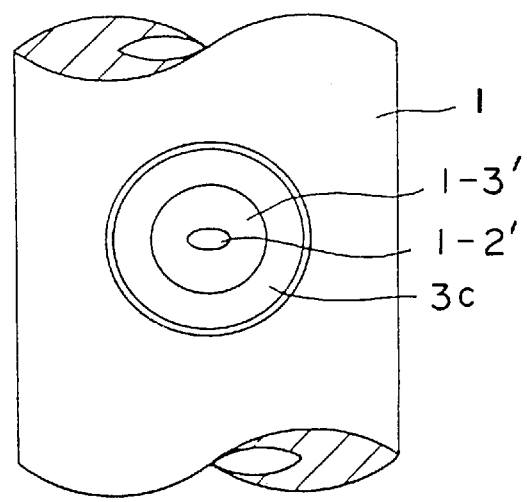
FIG. 4 is a top plan view showing a branch hole portion of a main pipe rail in the joint structure of the branch connector of FIG. 3.

In an example of the joint structure of the branch connector shown in FIGS. 3 and 4, on the other hand, the main pipe rail 1 having therein the conduit 1-1 on its axis is equipped as the joint portion 3 with the boss 3c having branch holes 1-2' at axial spacings in its circumferential wall. These branch holes 1-2' are elliptical holes, as identical to the aforementioned ones, which communicate with the conduit 1-1 and have circumferential faces opened to the outside and formed into pressure receiving seat 1-3'. The pressure face 2-3 formed by the joint head 2-2 of the branch connector 2 is brought into abutting engagement with the pressure receiving seat 1-3' of the main pipe rail 1, so that the branch pipe 2 is jointed to the main pipe rail 1 by fastening the cap nut 4b into the boss 3c.

Figure 5:
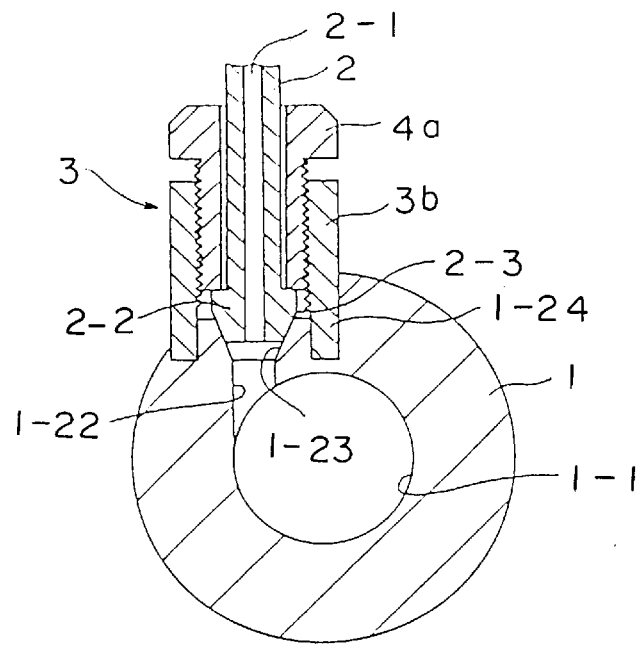
FIG. 5 is equivalent of FIG. 1, corresponding to a second embodiment of this invention.
Figure 6:
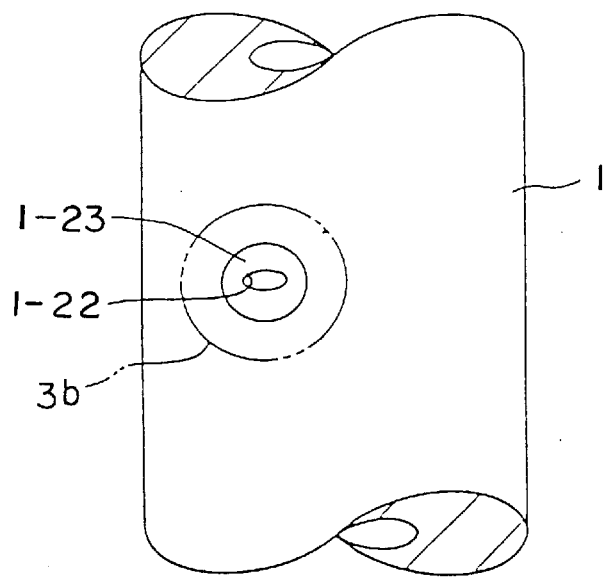
FIG. 6 is a top plan view showing a branch hole portion of a main pipe rail in the joint structure of the branch connector of FIG. 5.

In the joint structure of the branch connector in a common rail according to a second embodiment of the invention, as shown in FIG. 5, a branch hole 1-22, as made of an elliptical hole similar to the aforementioned one and communicating with the conduit 1-1 of the main pipe rail 1 with an eccentricity $\Delta 1$ from the center of the main pipe rail 1, has a circumferential face opened to the outside and formed into a pressure receiving seat 1-23. A fitting groove 1-24 having a proper depth is so formed concentrically of the branch hole 1-22 as to enclose the pressure receiving seat 1-23. The base end of the cylindrical sleeve nipple 3b is fitted in the fitting groove 1-24, and this fitting portion is soldered for the connection. The nut 4a, as assembled in advance with the branch connector 2, is screwed into the threaded face formed at the open side of the sleeve nipple 3b, to bring the pressure face 2-3 formed by the joint head 2-2 into abutting engagement with the pressure receiving seat 1-23 of the main pipe rail 1, so that the branch connector 2 is jointed to the main pipe rail 1 by fastening the nut 4a into the sleeve nipple 3b. In this joint structure, too, the branch hole 1-22 is formed, as shown in FIG. 6, into the elliptical hole which has a longer diameter normal to the axes of the branch hole 1-22 and the conduit 1-1 of the main pipe rail 1, and the pressure receiving seat 1-23 is a generally conical face for connecting the pressure face having a generally conical face similar to the aforementioned one. In this common rail, moreover, the size of the branch hole 1-22 having the elliptical shape is properly determined according to the maximum injection rate of the fuel, the diameter of the conduit and thickness of the common rail and so on. Still moreover, the eccentricity $\Delta 1$ of each branch hole is not especially restricted but is so preferably determined for reducing the stress P to be established at the open end of the branch hole 1-22 at the conduit 1-1 that the tangent of the inner wall of the conduit 1-1 of the main pipe rail 1 is substantially aligned with that of the inner face of the branch hole 1-22, as shown in FIGS. 5 and 6.

Figure 7:
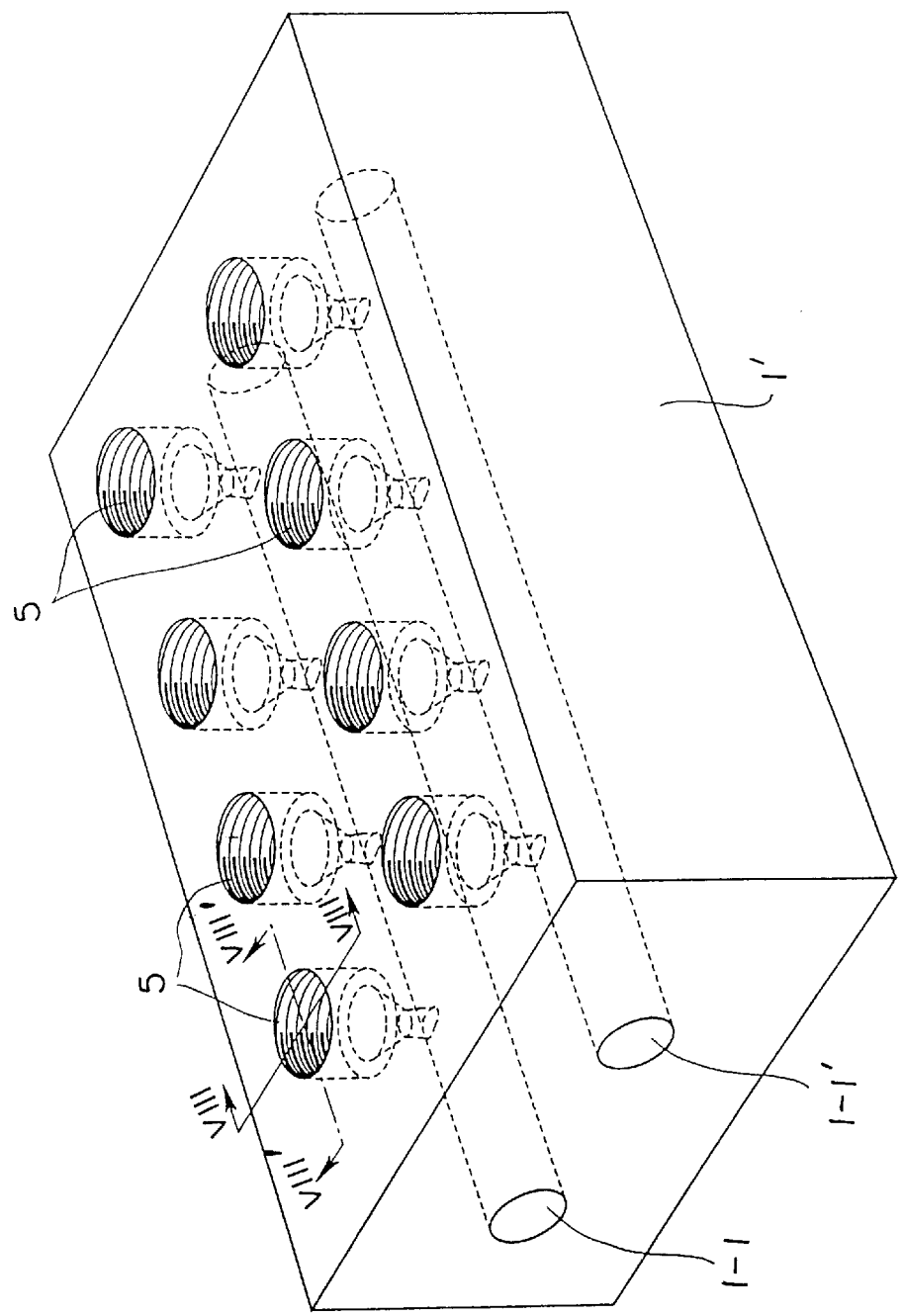
FIG. 7 is a perspective view of a block rail as a common rail.
Figure 8A:
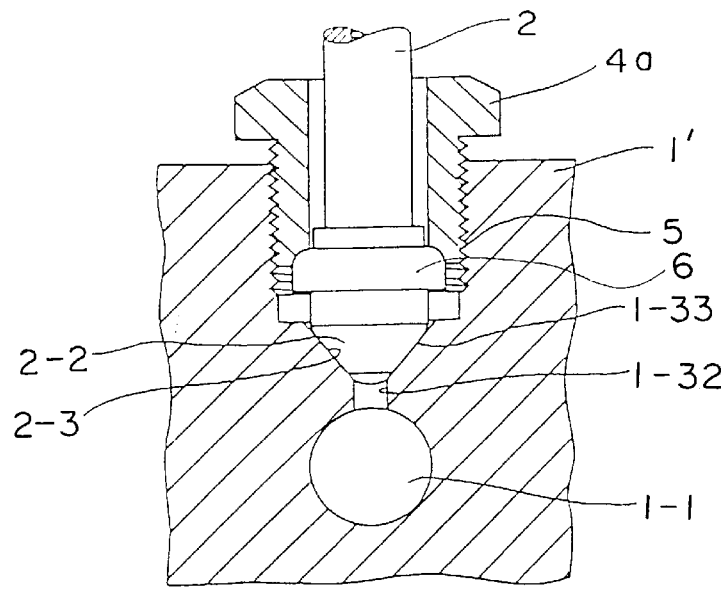
FIGS. 8A and 8B, show respectively a sectional view taken along line VIII—VIII and VIII–VIII' of FIG.7.
Figure 8B:
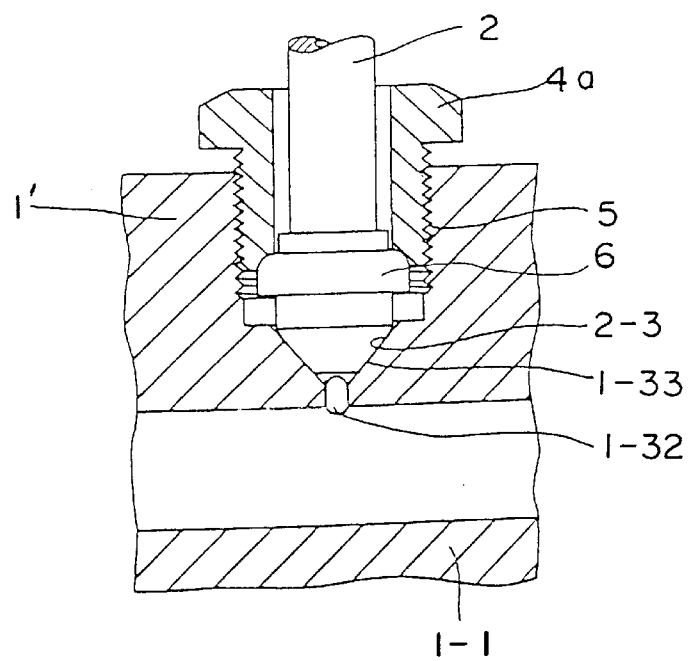
Figure 9A:
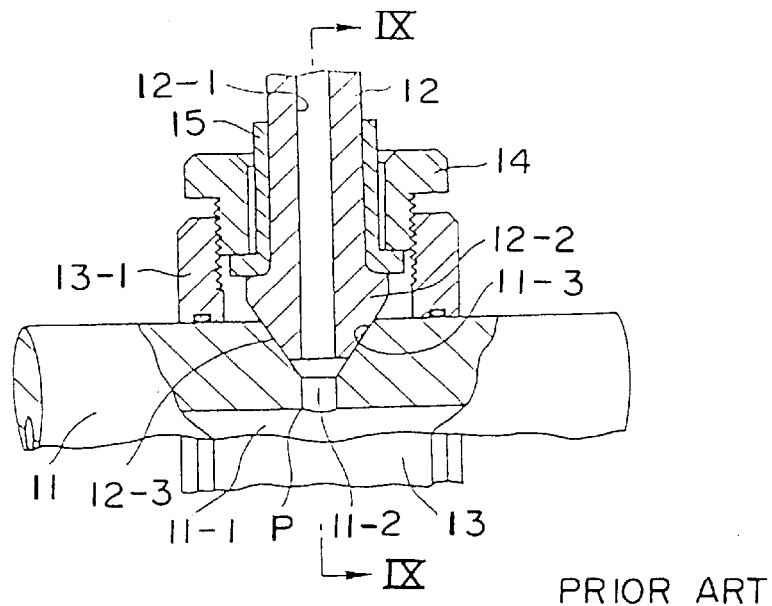
FIGS. 9A and 9B show a common rail of the prior art using a ring-shaped joint fitting, and respectively present a partially broken front elevation of the branch connector portion and a section taken along line IX—IX of FIG. 9A.
Figure 9B:
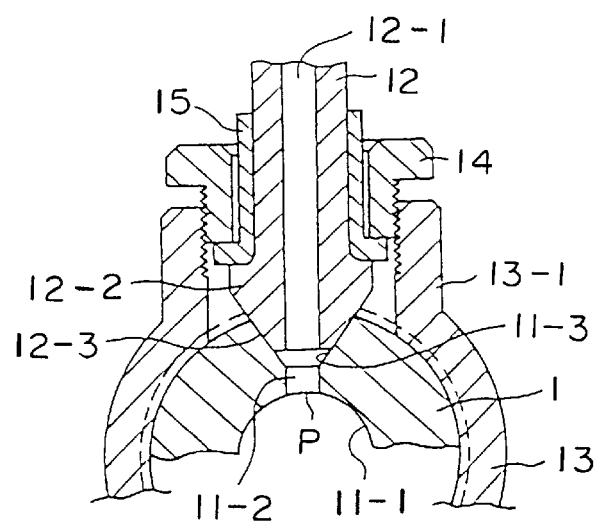
Figure 10A:
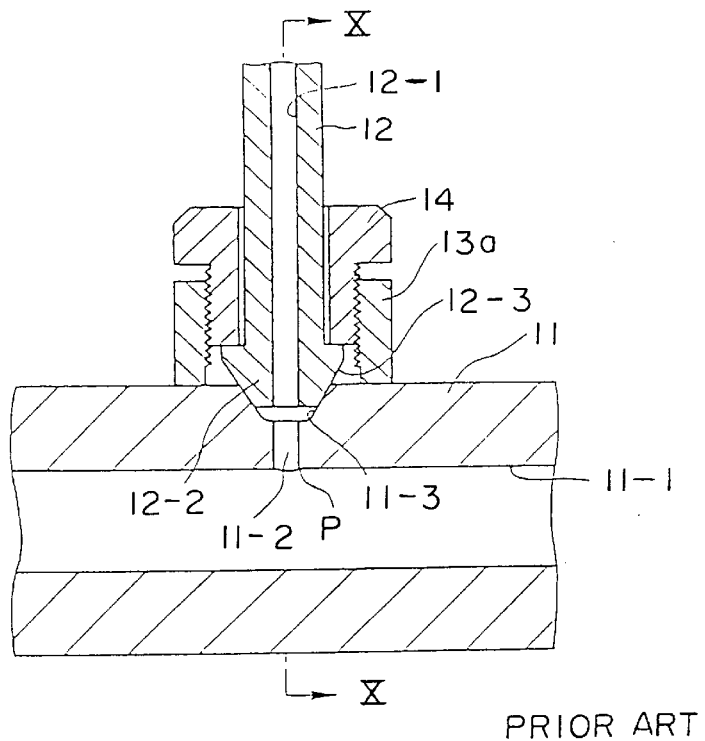
FIGS. 10A and 10B show a common rail of the prior art, which is constructed by mounting the cylindrical sleeve nipple to the main pipe rail by the welding method, and respectively present a partially broken front elevation of the branch connector portion and a section taken along line X—X of FIG. 10A.
Figure 10B:
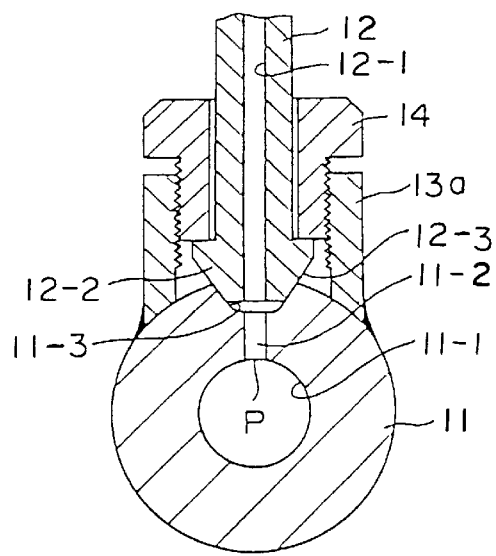

Further examples of the joint structure of the branch connector in commonrail are shown in FIGS. 7 and 8. In these examples, a main pipe rail as a common rail is replaced with a block rail 1', including circular sectional conduits 1-1, 1-1' communicating each other (not shown), having branch hole 1-32 of elliptical hole communicating with the conduits 1-1, 1-1' on its central axis and opened upward along a pressure receiving seat 1-33. A circular groove threaded upwardly along its inner circumference from the pressure receiving seat 1-33 is employed as a joint portion having and a nut 4a, as assembled in advance with the branch connector 2, is screwed into the threaded face along the inner circumference of the groove 5 to bring the pressure face 2-3 formed by the joint head 2-2 into abutting engagement with the pressure receiving seat 1-33 of the block rail 1' by fastening the nut 4a.

The reference numeral 6 designates a washer fitted behind the joint head 2-2 of the branch connector 2.

Figure 11:
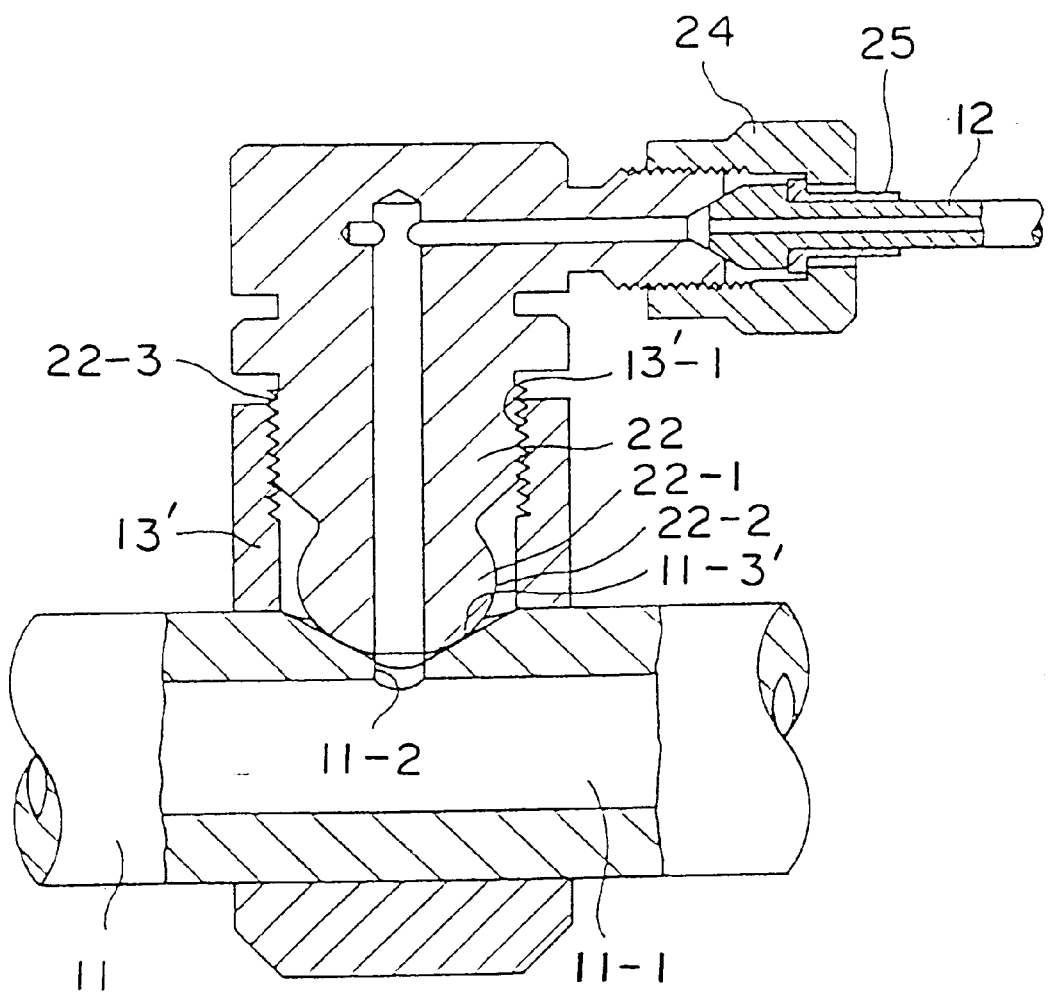
FIG. 11 is a partially broken front elevation showing the branch pipe connected portion of a common rail which is constructed by using a branch fitting equipped with a spherical pressure head having a spherical pressure face at one end.

In the above-mentioned embodiments, we have exemplified branch pipes employed as the branch connector 2, the branch fitting as shown in FIG. 11 can be also employed as a branch connector.

As has been described hereinbefore, the common rail of the invention is constructed such that the branch holes to be formed in the conduit having the substantially circular section are formed into elliptical holes having longer diameters normal to the axes of the branch holes and the conduit, and such that the elliptical branch holes are offset normal to the axes of the branch holes and the conduit of the main pipe rail. As a result, the stress to be established at the open end of the branch holes, as opened into the common rail conduit, branch holes can be reduced. Thus it is possible to exhibit reliable and stable functions by the high strength against the internal pressure fatigue at each branch hole, with excellent durability and no fuel leakage due to the cracks and, thereby to provide a remarkably useful common rail.

We claim:

1. A common rail having a circumferential wall and a conduit extending through the circumferential wall, the conduit being of a substantially circular section normal to its longitudinal direction and having a center, a plurality of branch holes formed in the circumferential wall at an axial spacing, each of said branch holes having a circumferential face and a pressure receiving seat formed on the circumferential face thereof and opened to the outside, a plurality of branch connectors for the respective branch holes, each said branch connector comprising a branch conduit to communicate with the conduit of said common rail, a joint head formed at the end of each said branch connector and forming a pressure face, each said branch connector being engaged with the common rail by bringing the pressure face thereof into abutment against one of the pressure receiving seats, a plurality of threaded joint portions extending transversely from said common rail and surrounding the respective branch connectors and nuts assembled on said respective branch connectors and fastened into said joint portion against said respective joint heads, wherein each said branch hole is an elliptical hole having a longer diameter normal to the respective branch connector and to the common rail and aligned with the center of the conduit of said common rail.

2. A common rail according to claim 1, wherein said joint portion integral with said common rail includes a boss or a circular groove.

3. A common rail according to claim 1, wherein said joint portion separate from said common rail includes a sleeve nipple or a ring-shaped joint fitting.

4. A common rail according to claim 1, wherein said common rail is made of a thick metal pipe having a section of true circularity.

5. A common rail according to claim 1, wherein said common rail is made of a main pipe rail comprising a manifold or a block rail.

6. A common rail having a circumferential wall and a conduit extending through the circumferential wall, the conduit being of a substantially circular section normal to its longitudinal direction and having a center, a plurality of branch holes formed in the circumferential wall at an axial spacing, each of said branch holes having a circumferential face and a pressure receiving seat formed on the circumferential face thereof and opened to the outside, a plurality of branch connectors for the respective branch holes, each said branch connector having a branch conduit to communicate with the conduit of said common rail, a joint head formed at the end of each said branch connector and forming a pressure face, each said branch connector being engaged with the common rail by bringing the pressure face thereof into abutment against one of the pressure receiving seats, a plurality of threaded joint portions extending transversely from said common rail and surrounding the respective branch connectors, and nuts assembled on said respective branch connectors and fastened into said respective joint portions against said respective joint heads, wherein each said branch hole is an elliptical hole having a longer diameter normal to both the respective branch connector and the common rail, each said elliptical hole further being offset from the center of the conduit of said common rail in a direction normal to both the respective branch connector and the common rail.

7. A common rail according to claim 6, wherein each said branch hole has an eccentricity so determined that a tangent of an inner circumferential surface of the conduit of said common rail is substantially aligned with the circumferential face of said branch hole.

8. A common rail according to claim 6, wherein said joint portion integral with said common rail includes a boss.

9. A common rail according to claim 6, wherein said joint portion separate from said common rail includes a sleeve nipple or a ring-shaped joint fitting.

10. A common rail according to claim 6, wherein said common rail is made of thick metal pipe having a section of true circularity.

11. A common rail according to claim 6, wherein said common rail is a main rail comprising branch pipes or a block rail.

* * * * *

UNITED STATES PATENT AND TRADEMARK OFFICE
CERTIFICATE OF CORRECTION

PATENT NO. : 5,979,945
DATED : November 9, 1999
INVENTOR(S) : Yuzo Hitachi, et. al.

It is certified that error appears in the above-identified patent and that said Letters Patent is hereby corrected as shown below:

Title page, item [73], Assignee: change "Usuikokusai Sangyo Kaisha Ltd." to --Usui Kokusai Sangyo Kaisha Ltd.--

Signed and Sealed this

Second Day of May, 2000

Attest:

Q. TODD DICKINSON

Attesting Officer

Director of Patents and Trademarks